United States Patent [19]

Anderson et al.

[11] Patent Number: 5,418,022
[45] Date of Patent: May 23, 1995

[54] METHOD OF FORMING A POCKET FROM A SPUNBONDED OLEFIN SHEET AND A MICROBIAL RESISTANT PACKAGE PRODUCED THEREBY

[75] Inventors: Gregory J. Anderson, Hugo; Ely T. Arcilla, North St. Paul; Chou I. Eyberg, Oakdale, all of Minn.; Scott A. Mundt, Brookings, S. Dak.

[73] Assignee: Minnesota Mining and Manufacturing Company, St. Paul, Minn.

[21] Appl. No.: 70,541

[22] Filed: Jun. 1, 1993

[51] Int. Cl.⁶ .............................................. B29D 22/00
[52] U.S. Cl. .................... 428/35.2; 428/36.1; 428/36.4; 206/439; 264/546; 53/128.1; 53/453
[58] Field of Search ............... 206/439; 428/35.2, 36.1, 428/36.4; 264/546; 53/453, 128.1

[56] References Cited

U.S. PATENT DOCUMENTS

| | | | |
|---|---|---|---|
| 3,547,257 | 12/1970 | Armentrout | 206/63.2 |
| 4,125,985 | 11/1978 | Laske | 53/452 |
| 4,306,656 | 12/1981 | Dahlem | 206/390 |
| 4,553,669 | 11/1985 | Butterworth et al. | 206/439 |
| 4,962,856 | 10/1990 | Carter | 206/439 |

OTHER PUBLICATIONS

Guise, W., "Thermoform-Fill-Seal Developments," *Packaging,* Dec. 1991, pp. 4–10.

Placenica, A., et al., "Package Integrity Methodoloby for Testing the Biobarrier Properties of Porous Package, Part I: Membrane Agar Plate Strike-Through Method," *Medical Device & Diagnostic Industry,* Apr. 1986.

Placencia, A., et al. "Package Integrity Methodology For Testing the Biobarrier Properties of Porous Packaging, Part II: FDA Exposure-Chamber Method," *Medical Device & Diagnostic Industry,* May 1986.

Du Pont Product Information Brochure–"Tyvek ® Rx spunbonded olefin" (1992).

Du Pont Product Information Brochure–"Sterile Packaging of Tyvek ®".

Du Pont Product Information–"Techniques for Tyvek ®"–Typical Properties of type 10 Tyvek ® Spunbonded Olefin (English Units).

3M Product Information–"Scotchpak"–Heat Sealable Polyster Film, Jul. 1, 1991.

*Primary Examiner*—George F. Lesmes
*Assistant Examiner*—Christopher W. Raimund
*Attorney, Agent, or Firm*—Gary L. Griswold; Walter N. Kirn; Jennie G. Boeder

[57] ABSTRACT

Packaging, particularly for medical supplies and devices, is made from spunbonded olefin sheet material. At least a portion of the olefin sheet material is deformed to increase its surface area by between 4 and 60 percent, so as to create a pocket of a dimension sufficient to envelope the medical supply or device. After the medical supply is placed within the pocket, it is covered and sealed by another sheet having microbial barrier characteristics. Even though deformed, the spunbonded olefin packaging possesses the ability to allow quick passage of sterilizing gas, yet is resistant to penetration by contaminating microorganisms.

8 Claims, 1 Drawing Sheet

METHOD OF FORMING A POCKET FROM A SPUNBONDED OLEFIN SHEET AND A MICROBIAL RESISTANT PACKAGE PRODUCED THEREBY

FIELD OF THE INVENTION

This invention relates to packaging, particularly for medical supplies and devices, made from spunbonded olefin sheet material. More specifically, it relates to a method of forming a pocket in a spunbonded olefin sheet while maintaining the material's microbial barrier characteristics.

BACKGROUND OF THE INVENTION

Spunbonded olefin sheets, such as those commercially available under the registered trademark "TYVEK®" from DuPont, Wilmington, Del., have gained use for various types of packaging. Spunbonded olefin sheets are tough, durable sheets of high density polyethylene fibers. The sheets are formed by flash spinning continuous strands of ultrafine interconnected fibers, dispersing them onto a moving belt and then bonding them together with heat and pressure into a multi-layer sheet. The combination of polymer and method of manufacture account for the ability of spunbonded olefin sheet material to be highly resistant to penetration by contaminating microorganisms, yet capable of allowing quick passage of sterilizing gas and accompanying moisture vapor. This combination of properties makes spunbonded olefin a particularly useful material for packaging medical supplies or devices which must be sterilized and maintained in sterile packaging until used. However, one drawback to the use of spunbonded olefin sheets for sterile medical packaging is that it has been believed that the material should not be subjected to package forming processes which would stretch or thermally form the material since to do so would cause holes to form in the spunbonded olefin sheets, thus rendering the sheets no longer resistant to contamination by microorganisms.

SUMMARY OF THE INVENTION

The present invention provides a package, particularly for medical supplies or devices, comprising spunbonded olefin sheet material, at least a portion of the sheet having been stretched or thermally deformed so as to increase the surface area of the portion by up to 60 percent from its original manufactured state. Even though deformed, the olefin sheet material has been found to maintain its microbial barrier characteristics.

The invention further provides a method of making microbial resistant packaging for medical supplies using at least one sheet of spunbonded olefin sheet material comprising thermally deforming or stretching at least a portion of the spunbonded olefin sheet by the application of heat and/or pressure to increase the surface area of the portion by up to 60 percent, so as to create a pocket of a dimension sufficient to envelope the desired medical supply. Preferably the pocket is a six-sided open pocket whose open side is covered and sealed by a second sheet of material having microbial barrier characteristics after the medical supply is placed within the pocket.

In a preferred embodiment this invention involves drawing a sheet of spunbonded olefin into a forming station, forcing a portion of the sheet against one or more heated platens using forced air, forcing the softened pliable portion of the sheet into one or more trays using forced air and/or vacuum, and cooling the resulting pocket-shaped spunbonded olefin sheet. Normally the formed pocket is six-sided and open at one major surface. Medical supplies are placed into the open pocket, and the open surface is preferably sealed by applying a second microbial-resistant sheet (referred to as a "lidding sheet") over the opening. Preferably the lidding sheet is a transparent polymeric material, such as a polyester or polyethylene film or laminates of such films. However, the lidding sheet may also be made of opaque materials such as coated paper, foils or even another sheet of spunbonded olefin sheet material. The polymeric lidding sheet may be sealed to the olefin pocket by any means which will produce a microbial-resistant sealed package, such as by adhesives or heat sealing. A particularly preferred lidding sheet material is a polyester film coated with a hot-melt adhesive, such as "Scotchpak ™ Heat Sealable Polyester Film 1220," commercially available from 3M.

Generally, in the manufacture of packages for medical supplies, such as surgical drapes, the packages are made in multiples; that is, one or more packages across the deformed olefin sheet. In these cases, the lidding sheet is usually sealed to the spunbonded olefin sheet prior to slitting and cutting the sheets into individual packages.

The process and packages of this invention are especially well suited for on-line loading; that is, the product to be packaged may be placed on the spunbonded olefin material after the pocket is formed and before the lidding sheet is sealed on all sides by conventional techniques to completely enclose the product in one operation.

The packaging made in accordance with this invention provides acceptable medical type packaging for a large variety of items. The packaging and enclosed item can be subjected to a sterilization cycle and the sterilant will readily penetrate the olefin sheet material to sterilize the item contained within the packaging. The packaging, even though containing a stretched or deformed spunbonded olefin sheet portion, is resistant to the penetration of microorganisms and can maintain the enclosed item in a sterile condition. The packaging can be used for non-medical items as well.

The objects, advantages and features of this invention will be apparent from the description together with the drawings showing preferred embodiments, wherein.

Figure 1:
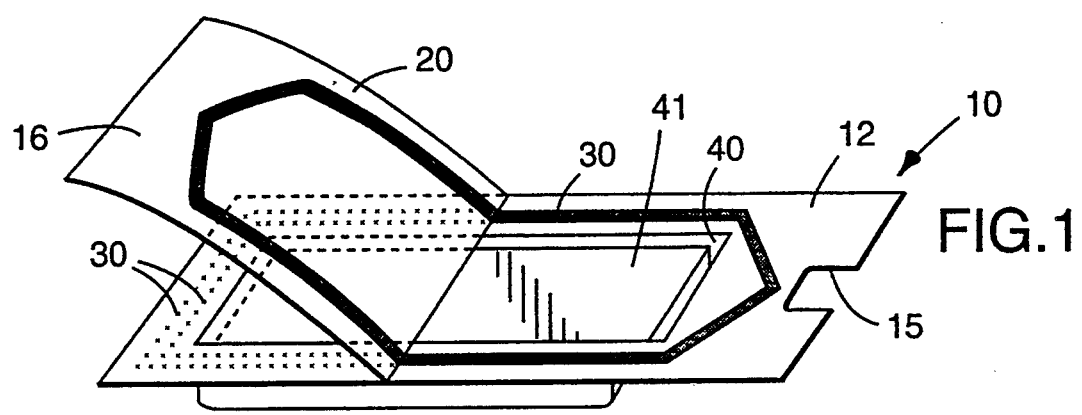
FIG. 1 is a perspective of a partially opened package made according to the process of this invention.
Figure 2:
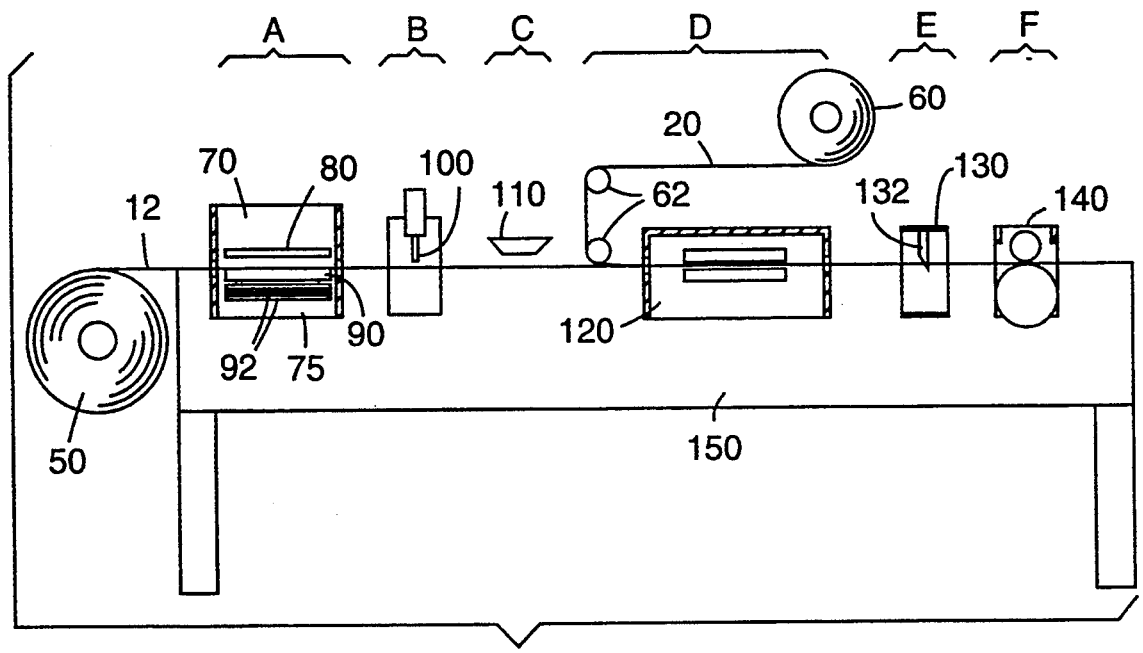
FIG. 2 is a side view of an apparatus to form packages according to the process of this invention.

Referring to FIG. 1, it will be seen that package 10 results from the operation of the method of this invention utilizing the apparatus shown in FIG. 2. Package 10 comprises a sheet 12 of spunbonded olefin material, commercially available as "TYVEK® 1073B Spunbonded Olefin" from E.I. DuPont de Nemours, Inc., Wilmington, Del., a portion of which has been formed into a pocket 40, a lidding sheet 20, and a peel seal area 30 surrounding pocket 40 where olefin sheet 12 and lidding sheet 20 are joined. A thumb notch 15 in olefin sheet 12 and a peel flap 16 on lidding sheet 20 provide the mechanism by which the person opening the package can grip both sheets 12 and 20 and separate them along the peel seal area 30. In FIG. 1, a product 41, such as a surgical drape, is shown placed within pocket 40.

Referring to FIG. 2, it will be seen that roll 50 of spunbonded olefin sheet 12 is mounted on a suitable support, along with another roll 60 of the lidding sheet 20. Roll 50 is mounted with suitable unwind mechanisms (not shown) at the end of machine frame 150. Roll 60 is mounted with suitable unwind mechanisms (also not shown) above machine frame 150. Located at forming station A is an upper half forming section 70 with a heating platen 80 and a lower half forming section 75 with a forming tray 90 which determines the shape of pocket 40 and spacers 92 which determine the depth of pocket 40. The shape and quantity of platens 80, and trays 90 in the forming section will depend on the desired shape and quantity of pockets. At punching station B, a thumb notch punch 100 is used to punch a notch area 17 which will become the thumb notch 15. At loading or filling station C, a loading mechanism 110 puts a product 41 into the formed pocket either automatically or by hand. At sealing station D, a sealing section 120 contains a heated die to heat-seal lidding sheet 20 to spunbonded olefin sheet 12 to form peel seal area 30. At cross cutter station E a sheeter 130, which contains a cutting means 132, makes a cross-cut 19 across a row of packages at the notch areas 17. At slitter station F, a slitter 140, which contains a slitting means, separates the packages in the machine direction. It is recognized that razors or any suitable slitting means can be used. The finished packages 10 are discharged from the machine. Apparatus for assembly line thermoform-fill-seal packaging, such as described herein, is commercially available as "Multivac M855, R5200, and R7000" from Multivac, Inc., Kansas City, Mo. While with the method and packaging apparatus described above, the product 41 to be packaged is placed within the pocket 40 in the olefin sheet 12 prior to being covered by lidding sheet 20 and sealed on all sides to completely enclose the product 41, it is also within this invention to seal lidding sheet 20 to olefin sheet 12 on less than all sides and put product 41 into a partially sealed package 10. After product 41 is placed within the package, sealing of the lidding sheet 20 to olefin sheet 12 is completed.

Figure 3:
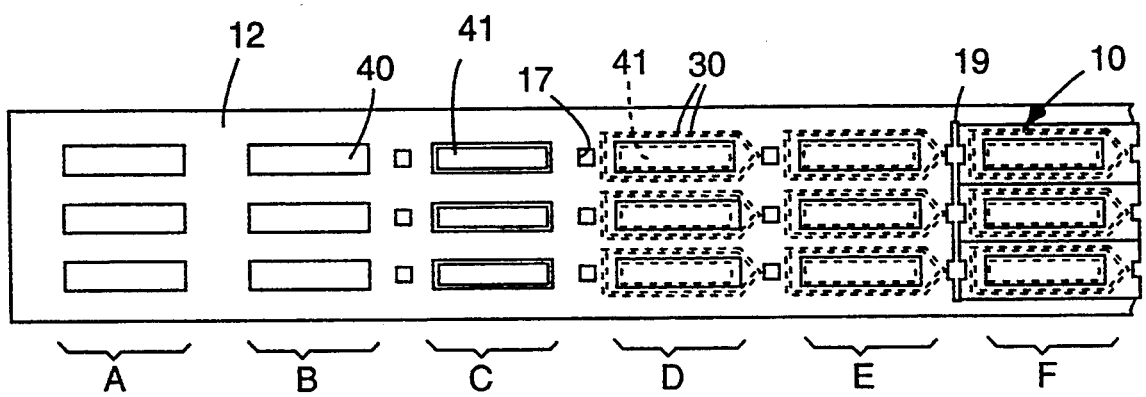
FIG. 3 is a schematic top view of material as it proceeds through the apparatus of FIG. 2 to produce packages according to the process of this invention.

In FIG. 3, the stations denoted by capital letters A–F correspond to the stations denoted in FIG. 2. Spunbonded olefin sheet 12 is threaded into gripper chains (not shown) which hold the sheet on both sides throughout the process from A through F. Spunbonded olefin sheet 12 is drawn into the forming station A and clamped between the upper and lower halves of the forming sections, 70 and 75, where vacuum and/or compressed air is used to pull and/or press the spunbonded olefin sheet 12 against one or more heated platens 80 within upper forming section 70 until the spunbonded olefin sheet 12 softens and becomes pliable; then vacuum and/or compressed air is used to pull and/or press the spunbonded olefin sheet 12 down into the forming trays 90 within lower forming section 75 where the spunbonded olefin sheet 12 is allowed to cool to form pockets 40.

The interdependent conditions which can be varied at forming station A are time, temperature, pressure and pocket depth. Preferably platens 80 are heated to a temperature between the softening temperature and the melt temperature for the spunbonded olefin sheet material. Normally this temperature is between about 80° and 140° C., preferably between about 90° and 130° C. The air pressure applied to push the spunbonded olefin sheet 12 against the heated platens 80 is preferably between about 10 and 50 psi, more preferably between about 20 and 40 psi. The time period during which the spunbonded olefin sheet 12 is subjected to heating by the platens 80, in order to soften the sheet 12 and make it pliable, is preferably between about 0.6 and 3.0 seconds, more preferably between about 0.8 and 2.0 seconds. The time period during which the olefin sheet 12 is allowed to cool in the forming tray 90 in order to form pocket 40 is preferably between about 0.4 and 3.0 seconds. The spacers 92 are normally adjusted so that the pocket 40 has a depth of preferably between about 2 and 20 mm, more preferably less than about 18 mm.

The process parameters at forming station A can be controlled individually, but it is their interactions which determine the performance of the thermoformed olefin sheet as a microbial barrier. Thus, if the forming temperature is high, the time of heating the olefin sheet needs to be decreased, and if the forming temperature is low, the time of heating may be increased. Where formation of a greater pocket depth is desired, the forming temperature and time of heating the olefin sheet 12 need to both be as low as possible in order to form a pocket in the olefin sheet which maintains its microbial barrier characteristics.

After pocket 40 is formed, spunbonded olefin sheet 12 is unclamped from forming station A and advanced to punching station B where the thumb notch punch 100 cuts notch areas 17 in the spunbonded olefin sheet to aid the separation of the spunbonded olefin sheet 12 and lidding sheet 20 when the completed package is opened. Next the olefin sheet 12 advances to loading station C where products 41, such as surgical drapes, surgical gloves, syringes, instruments, contact lens cleaning sets, etc., are loaded into formed pockets 40. Spunbonded olefin sheet 12 advances again to sealing station D where lidding sheet 20 is guided into position from roll 60 by a pair of idler rolls 62 in order that it can be positioned over olefin sheet 12 and under sealing section 120. Sealing station D preferably provides suitable heat and pressure to seal the desired areas of the sheets together under conventional conditions for heat sealing polymeric materials. While heat sealing has been described, other methods of adhering lidding sheet 20 to the spunbonded olefin sheet 12, such as cold seal, conventional adhesives, ultrasonic welding, etc., can be used. As spunbonded olefin sheet 12 advances to cross cutter station E, a cutting-means 132 makes a cross-cut 19, thereby creating sheets of packages prior to slitting the sheets in slitter station F into individual packages.

The packages made by this process provide very acceptable medical type packages for holding a variety of items intended for sterilization. The packages made according to this invention may also be used for any other article that will be sterilized.

It will be obvious to one skilled in the art that the apparatus and methods shown in FIGS. 2 and 3 are merely exemplary of one method of making a particular package and that other methods and apparatus well known in the art may be utilized for fabrication of other shapes and configurations of packages. This invention relates to the process for forming pockets in spunbonded olefin material regardless of configuration. When the spunbonded olefin sheet 12 is thermoformed into pocket 40, the surface area of the sheet is enlarged. The percent of enlargement of this surface area is preferably less than 60 percent, more preferably less than 30 percent in order to assure that the spunbonded olefin packaging retains its microbial barrier characteristics. In a preferred embodiment, sheet 12 in the area of pocket 40 is enlarged to between 0.1 and 60 percent, more preferably between 4 and 30 percent.

The following test method was used to determine the microbial barrier properties of packaging of the present invention.

TEST METHODS

The Food and Drug Administration (FDA) Standard Test Methods for Microbial Ranking of Porous Packaging Materials published as "Package Integrity Methodology for Testing the Biobarrier Properties of Porous Packaging, Part II: FDA Exposure-Chamber Method" by Ana M. Placencia, Gordon S. Oxborrow, and James T. Peeler in *MEDICAL DEVICE & DIAGNOSTIC INDUSTRY* April and May, 1986, incorporated herein by reference, was used to determine the microbial barrier properties of the spunbonded olefin sheet material before and after forming a pocket.

The dry method for determining the biobarrier properties of porous packaging materials is a simple procedure for testing packaging materials for their ability to withstand penetration by bacterial aerosols. In accordance with this procedure, discs of packaging materials are subjected to an aerosol with a concentration of at least $10^3$ *Bacillus subtilis* var. *niger* spores using an aerosol exposure chamber and microbial filtering units. The effectiveness of the packaging materials in preventing airborne microbial contamination is evaluated using the following procedure:

1. Discs (47 mm diameter) were cut from the spunbonded olefin test materials and conditioned for 24 hours at ambient conditions.
2. An aerosol exposure chamber system is set up in a biohazard hood.
3. A filter membrane was placed on the base of a microbial filtering unit which has a base and cup assembly (See FIG. 1 in "Part II: FDA Exposure-Chamber Method").
4. A test material disc is placed on top of the membrane.
5. The cup assembly is attached to the base of the filtering unit.
6. The filtering unit is attached to a port in the bottom of the exposure chamber. There are 6 ports per chamber (See FIG. 2 in "Part II: FDA Exposure-Chamber Method").
7. The bottom of the filtering units are connected to a vacuum manifold.
8. Air flow is started through the atomizer/nebulizer which is attached by a tube to the side of the exposure chamber; the vacuum is started; the flow rate is adjusted through each filtering unit (See FIG. 3 in "Part II: FDA Exposure-Chamber Method"); the nebulizer is injected with a 3 ml spore suspension at a specific spore cell concentration, and a fan inside the exposure chamber is turned on in a rapid sequence to get a uniform dispersion of the spores in the exposure chamber.
9. The exposure is run until 1 ft³ of the aerosol is drawn through the test material and the membrane filter.
10. Air flow to the nebulizer is turned off; and air flow is started through another filter assembly to evacuate the exposure chamber for 15 minutes (See FIG. 4 in "Part II: FDA Exposure-Chamber Method").
11. Vacuum and air flow is turned off.
12. The filtering units are removed from the exposure chamber.
13. The cup assemblies are separated from the base of the filtering units.
14. The test sample discs are removed and discarded.
15. The membranes are removed and placed on TSA plates with the exposed side up.
16. The TSA plates are incubated at 35° C. for 24 hours.
17. The colony forming units on each membrane and the number of membranes having any colony forming units are counted and recorded.

The number of colony forming units to which each disc is exposed is determined as follows: Control samples (5) are taken during the testing of the olefin samples by using a seventh filtering unit attached to the front of the exposure chamber by a hose connected to an adaptor/cover of a disposable cup assembly. The base of the filtering unit is connected to the vacuum manifold. The filter membrane is placed on the base of the unit, but no test material disc is used. The entire filtering unit is removed after one minute intervals and replaced by a new filtering unit. Each filter membrane is removed and placed on a TSA plate with the exposed side up. The TSA plate is incubated at 35° C. for 24 hours. The colony forming units (cfu) are counted and recorded.

The packaging materials are evaluated for contamination potential by the dry method using logarithm reduction (LR). That is, on a logarithmic basis, how many microorganisms out of a given exposure are unable to penetrate the packaging material. The number of colony forming units on each membrane are used to calculate a logarithm reduction as follows:

a)
T = time the test material is exposed (15 min.)
N = total number of control samples (5)
$N_X$ = total number of cfu in the five control samples exposed for 1 minute
$N_A$ = average number of cfu/min = $N_X/N$
$N_T$ = total bacterial exposure on the sample material per run = $N_A$ T
A = area of sample material exposed ($\pi r^2$)
$V_1$ = volume of air (liters per minute) used to expose the material (1 ft³min)
$V_T$ = total vol of air used to expose the material = ($V_1$)(T)
$N_O$ = number of (cfu/cm²)/liter exposed on the material = ($N_T$/A)/($V_T$)

b)
$X_T$ = number of cfu on membranes for test material samples
X = number of (cfu/cm²)/liter that passed through the test material = ($X_T$/A)/($V_T$)

c)
LR = Logarithm Reduction = $\log_{10} N_O - \log_{10} X$

Interpretation of results is as follows:

| Contamination Potential of Packaging Materials Based on Logarithm Reduction (LR) | |
|---|---|
| Logarithm Reduction (LR) | Contamination Potential |
| >3 | low |
| >2 ≦ 3 | medium |
| ≦2 | high |

Thus, any thermoformed spunbonded olefin material having a logarithm reduction value of greater than 2 is an acceptable microbial barrier. Preferably the thermoformed spunbonded packaging of the present invention has log reduction values of greater than 2.1, using the procedure described above.

EXAMPLES 1-7

In order to verify microbial barrier properties for the spunbonded olefin packaging materials of this invention, pockets were formed in "TYVEK® 1073B Spunbonded Olefin" material using the "Multivac M855" packager for Examples 1-3 and the "Multivac R5200" packager for Examples 4-7 and Comparative Example 1. The spunbonded olefin sheets were threaded into the packagers. The heating temperature, heating time, forming time and pocket depth for each example are given in Table I. The air pressure was maintained at 30 psi. Samples were cut from the pocket area of each sheet before loading or sealing the package. The samples were tested in accordance with the test methods described above. *Bacillus subtilis* var. *niger* at a concentration of $10^4$ cfu/ml was used in the nebulizer. The results for an average of 18 samples per example are reported in Table 1.

Comparative Examples 2 and 3 were controls of unformed "TYVEK® 1073B Spunbonded Olefin," as manufactured, which were tested using the same procedure as described above for Examples 1-7.

TABLE 1

| Example | Heating Temperature (°C.) | Heating Time (Seconds) | Forming Time (Seconds) | Pocket Depth (mm) | Barrier Properties (log reduction) Dry |
|---|---|---|---|---|---|
| 1 | 100 | 0.8 | 1.2 | 3.0 | ∞ |
| 2 | 110 | 0.8 | 1.2 | 6.1 | ∞ |
| 3 | 130 | 0.8 | 1.2 | 6.1 | ∞ |
| 4 | 110 | 3.0 | 1.0 | 2.0 | 2.42 |
| 5 | 110 | 1.0 | 3.0 | 18.0 | ∞ |
| 6 | 110 | 1.0 | 1.0 | 2.0 | 2.03 |
| 7 | 110 | 1.0 | 1.0 | 18.0 | 2.52 |
| Comp. 1 | 125 | 2.0 | 2.0 | 10.0 | 1.85 |
| Comp. 2 | 25 | — | — | — | 2.16 |
| Comp. 3 | 25 | — | — | — | 2.67 |

The microbial barrier properties of the thermoformed materials of Examples 1-5 and 7 were equal to the microbial barrier properties of unformed "TYVEK® 1073B Spunbonded Olefin" (Comparative Examples 2 and 3). The potential for contamination for the thermoformed material of Example 6 exceeds that for unformed "TYVEK® 1073B Spunbonded Olefin," but is still in the low range. Comparative Example 1 failed the test for potential contamination. This was caused by the combined effort of temperature, heating time, forming time and pocket depth. Note that the pocket depth, temperature of forming, heating time and forming time are each near the highest end of the range for optimum operating conditions.

We claim:
1. A microbial resistant package comprising a spunbonded olefin sheet, at least a portion of said sheet having been thermally deformed so as to increase the surface area of the portion by between 4 and 60 percent from its manufactured state thereby creating a pocket within said spunbonded olefin sheet, said olefin sheet material when tested for biobarrier properties in accordance with the procedure described in "Package Integrity Methodology for Testing the Biobarrier Properties of Porous Packaging, Part II," as published in *Medical Device and Diagnostic Industry*, April and May 1986, has a log reduction value, as described herein, of greater than about 2.0.

2. The microbial resistant package of claim 1 wherein the surface of the olefin sheet portion has been thermally deformed so as to increase its surface area by between 4 and 30 percent.

3. A method of making microbial resistant packaging for products comprising:
   (a) thermally deforming at least a portion of a first spunbonded olefin sheet to increase the surface area of the portion by between 4 and 60 percent, so as to pull a pocket in said first sheet which has a volume sufficient to envelope the desired product; and
   (b) affixing to at least a portion of said spunbonded olefin sheet a second microbial resistant sheet so as to partially lid the package;

wherein said packaging when tested for biobarrier properties in accordance with the procedure described in "Package Integrity Methodology for Testing the Biobarrier Properties of Porous Packaging, Part II," as published in *Medical Device and Diagnostic Industry*, April and May 1986, has a log reduction value, as described herein, of greater than about 2.0.

4. The method of claim 3 wherein the spunbonded olefin sheet is thermally deformed by heating it to between about 80° and 140° C. for between about 0.6 and 3.0 seconds.

5. The method of claim 3 wherein the pocket within said first spunbonded olefin sheet is between 2 and 20 mm in depth.

6. The method of claim 3 wherein the second microbial resistant sheet comprises a polyester or polyethylene film.

7. The method of claim 3 further comprising:
   (c) placing the product to be packaged within the pocket in the first spunbonded olefin sheet; and
   (d) completely sealing the second microbial resistant sheet to the first olefin sheet over the pocket in the first spunbonded olefin sheet so as to enclose the product within the package.

8. The method of claim 3 wherein prior to affixing the second microbial resistant sheet to the spunbonded olefin sheet, the product to be packaged is placed within the pocket formed in the spunbonded olefin sheet.

* * * * *